Aug. 31, 1937.  H. KUPPENBENDER  2,091,762
EXPOSURE METER
Filed May 31, 1935  2 Sheets-Sheet 1
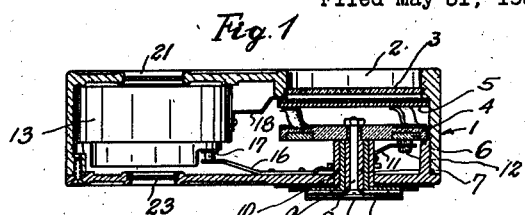
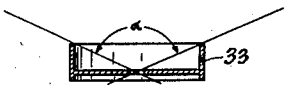
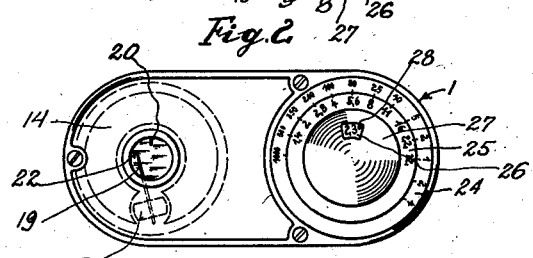
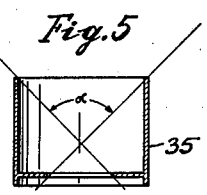
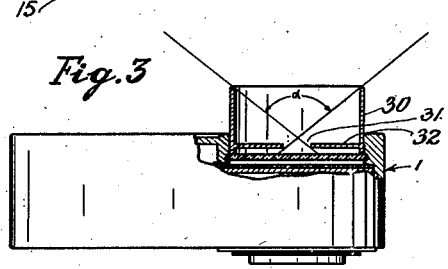
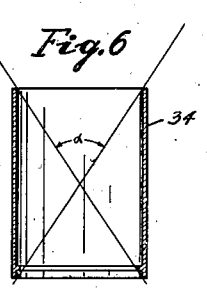
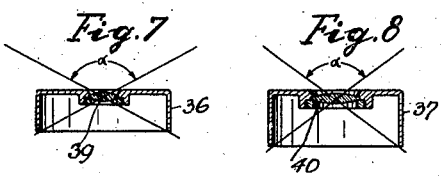 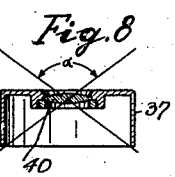 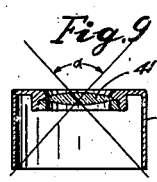 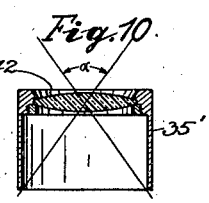
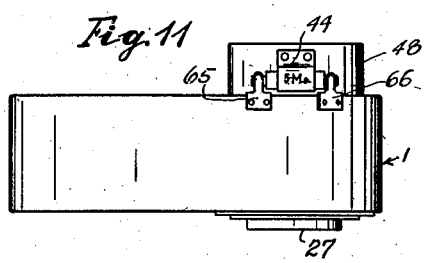
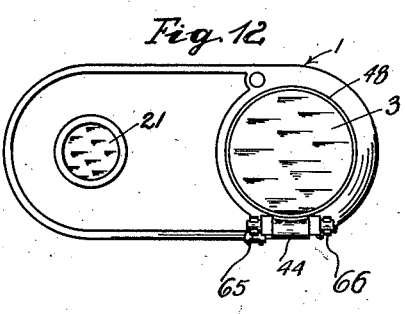
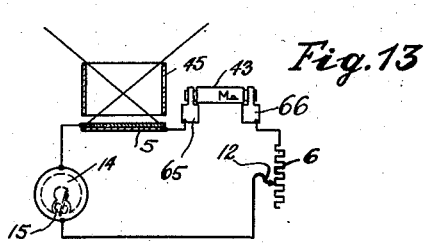
Inventor
Heinz Küppenbender
by B. Singer
Att'y Aug. 31, 1937.   H. KUPPENBENDER   2,091,762
EXPOSURE METER
Filed May 31, 1935   2 Sheets-Sheet 2
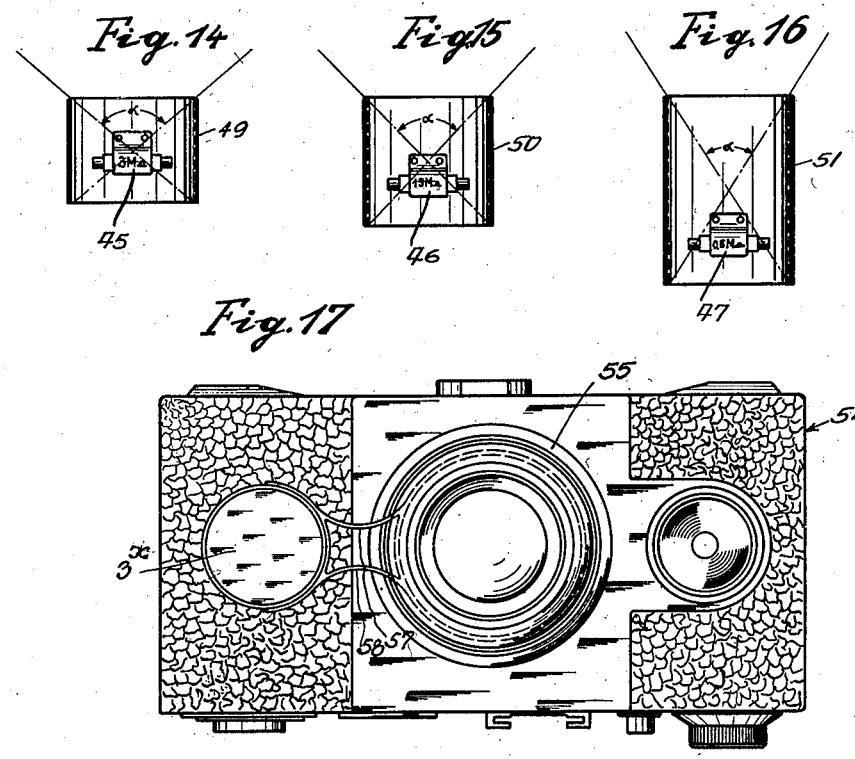
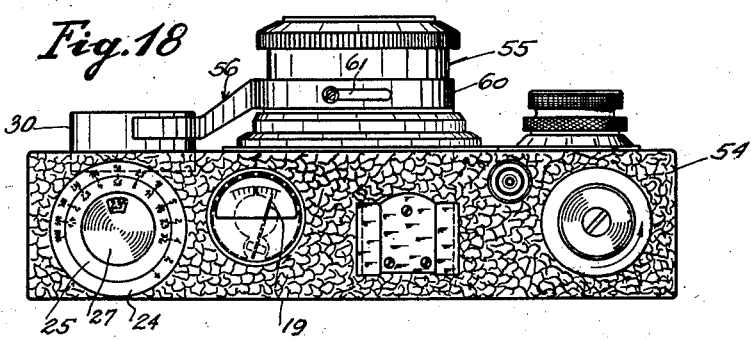
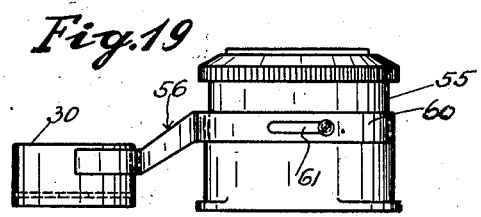
Inventor
Heinz Küppenbende
by B. Singley
Atty Patented Aug. 31, 1937

2,091,762

UNITED STATES PATENT OFFICE 2,091,762

EXPOSURE METER

Heinz Kuppenbender, Dresden, Germany, assignor to Zeiss Ikon Aktiengesellschaft, Dresden, Germany Application May 31, 1935, Serial No. 24,291
In Germany June 29, 1934

10 Claims. (Cl. 88—23)

This invention relates to improvements in exposure meters.

In predetermining the proper length of a photographic exposure by means of an electric photometer, the fact that lenses also may have different speed must be taken into consideration, else the same exposure meter will not indicate correctly for different lenses those data which would assure the proper depth and contrast of the image. The reason why the data are somewhat inaccurate lies in the fact that the ordinary electric photometer reacts solely to the intensity of illumination at a fixed angle. The camera, however, advisably uses lenses of different "angles" for making pictures of different objects, scenes and the like, under different conditions. The correct photometrical indications, therefore, will be presented solely when the angle of the lens of the photometer corresponds to the angle of the lens of the camera. If the camera, for instance, should use a wide angle lens, while the photometer has a lens of ordinary angular width, the photometrical indications would lead to exposure periods of excessive length, since these indications would not be based on the wide angle of the camera lens.

In order to eliminate inaccuracy in photoelectric determinations for photographic exposures, the present invention has the object of providing corrective means adapted to bring the angle of incidence of light for the photometer to agree approximately or accurately with the focal angle of the lens which for any particular purpose has been selected for the camera.

It is an object of the present invention to provide an electric exposure meter in which adjustment of the instrument is readily effected by setting an exposure dial together with a resistance in the circuit until the instrument shows a readily observable reading position.

It is also an object of the invention to provide an electric exposure meter wherein the various adjustments or settings to the sensitiveness of the selected film, diaphragm opening, exposure time and resistance can be carried out very simply and effectively.

It is also an object of the invention to provide sets of readily detachable corrective elements which can be individually applied selectively to photometers or be removed therefrom.

Another object of the invention is to modify the sensitiveness of a photometer by attaching different pieces of optical equipment to the light absorbing part thereof in order to harmonize this sensitiveness with the speed of the lens.

The invention also has the object of modifying the sensitiveness of an electric exposure meter by selectively combining therewith different resistances, and to determine the proper exposure time through an additional variable resistance to affect the position of an indicator in an electric circuit.

With these and numerous other objects in view, the invention is described in the following specification in which reference is made to the drawings.

In the drawings:

Fig. 1 is a sectional view through an electric exposure meter;

Fig. 2 is a top plan view of the same;

Fig. 3 is an elevation and part section with one of the corrective means applied to the meter;

Figs. 4 to 6 inclusive are sectional views of different embodiments of the corrective means applicable to the photometer;

Figs. 7 to 10 are sectional views of different modifications of these corrective means;

Fig. 11 is a side elevation of a photometer having an additional modified corrective means applied thereto;

Fig. 12 is a top plan view of the same;

Fig. 13 is a wiring diagram for the use of the corrective means illustrated in Figs. 11 and 12;

Figs. 14 to 16 inclusive show side elevations of different embodiments of corrective means of the type illustrated in Figs. 11 and 12.

Fig. 17 is a front elevation of a camera with the corrective means for the photometer attached to the lens mounting;

Fig. 18 is a plan view of a camera with the attachment of the corrective means for the photometer secured to the lens mounting, and Fig. 19 is a detail elevation of a lens mounting with one corrective means pertaining to the respective lens exclusively secured thereto.

The exposure meter shown in Figs. 1 and 2 comprises a housing 1 of substantially elliptic cross-section having in its front or top face an opening 2 at the rear of which a transparent plate 3 is secured. Back of this transparent plate and adapted to be struck by the light emanating from the object to be photographed is a photosensitive element or cell 5 in the circuit of which there is mounted an electric resistance 6 shown here in the form of a flat coil supported on a disc 4 or the like. Resistances of this type are well known for photometric purposes. The carrier 4 of the resistance coil 6 is supported from one flat wall of the housing 1 by means of a shouldered bushing 7, which is held in position within the housing by a bolt 8. Other bushings 9 and 10 surround the fixed bushing 7 and these additional bushings are associated with dials rotatably secured to the outside of the housing so as to be accessible to inspection or to manual adjustment by the user of the instrument. The outer bushing 10 carries a clip 11 terminating in a wiper contact 12 which is in engagement with the resistance 6, whereby depending upon the position of this contact in respect of the annular resistance coil, the current produced due to the electromotive force of the photoelement may be varied.

Another portion of the housing 1 contains a casing 13 wherein a movable element is mounted, the position of which depends upon conditions in the circuit containing the photosensitive element 5 and the resistance 6. The casing 13 for this purpose contains a substantially annular electromagnet 14, Fig. 13, having a gap between its pole shoes wherein a coil 15 is rotatably suspended. The winding of this coil is conductively connected with the outer bushing 10 by means of a clip 16 in frictional conductive engagement with the bushing and leading to a strip 17 from which a connection, not shown in the drawings, extends to one end of the rotatable coil 15. The other end of this coil may be connected to the casing 13 and the electric circuit is completed by a clip 18 extending from this casing back to the photoelectric element or battery 5.

The rotary coil 15 carries a pointer 19 which is adapted to move into and out of opposition to a mark 20 fixed to the housing 1. The position of the pointer relatively to the mark can be inspected through an opening 21 in the wall of the housing 1, which opening also may be provided with a transparent closure 22. To facilitate this inspection, the opposite wall of the housing also may have an opening with a transparent closure 23 permitting the light to pass through these openings.

Bushing 10 is combined with a dial 24 externally of the housing. The intermediate bushing 9 carries at its projecting end another dial 25. Bolt 8 which supports the resistance carrier 4 carries at the projecting end a fixed dial 26, the three dials being concentric with each other. The intermediary dial 25 is provided with a shallow central cap 27 covering the stationary dial 26. The indications of this intermediary dial 25, however, are applied to the marginal flange of the same, and the cap 27 has a single movable indicating means in form of an opening 28 for cooperation with indicating means provided on the stationary dial 26.

The operation of the photometer is about as follows: The intermediate dial 25 carries on its flange the indications for the diaphragm opening to be used. The stationary dial 26 has indications for the sensitiveness of the film or plate (Scheiner degrees) on which the exposure is to be made. The outer dial 24 carries on a marginal portion the indications for the exposure time.

The operator knowing which Scheiner degree applies to the film or plate in use manually adjusts the intermediate dial 25 and the protective cap 27 until the indicator 28 thereon renders visible the respective indication of Scheiner degrees on the stationary dial below, as shown at "23°" in Fig. 2. The operator then adjusts the outer dial 24 while directing the photometer against the object to be photographed until by the regulation of the resistance 6 in the circuit of the cell 5, the pointer 19 of coil 15 is in opposition to the fixed mark 20 on the window 22 which he observes. The dial 24 then indicates the proper exposure time required upon selecting a certain diaphragm opening.

If the pointer 19 of the coil is in neutral position, when the dials have the mutual relation as shown in Fig. 2, this means that with a film of 23 degrees Scheiner, the exposure periods would be as follows: for a diaphragm opening 32, 1 second, diaphragm opening 22, ½ second, diaphragm opening 16, ⅕ second, etc.

A skilled photographer, uses lenses of different optical characters for different subjects. The field angle of these lenses is not the same. It is advisable, therefore, to harmonize the exposure meter with the angle of the lens selected.

In order to apply a corrective means or means for varying the angle of incidence for the light energizing the photoelectric cell, tubular extensions having suitable diaphragm openings may be positioned over the window 3 of the photometer. An extension of this type, as shown for instance at 30, Fig. 3, determines through the relation of the opening 31 in this diaphragm 32 and through the height of the extension a certain angle as indicated in Fig. 3 at α. This angle may correspond to the angle of the lens employed for the respective exposure. Upon applying a different lens to the camera, therefore, it is also of advantage to apply a different corrective means.

Figs. 4, 5 and 6 show various embodiments of the same type of correcting means, illustrating for instance in Fig. 4 an extension 33 which may be applied when the camera uses a wide angle lens while Fig. 6 shows a corrective means 34 to be used when the camera takes a picture with a narrow angle lens. The corrective means illustrated in Figs. 3 and 5, at 30 and 35 respectively, are of the same type but illustrate intermediary angle values of these corrective means.

A different type of a correcting device is illustrated in Figs. 7 to 10 whereby also the angularity of the photometer is adjusted in accordance with the angularity of the lens applied to the camera. The corrective means of Figs. 7 to 10 determine the angularity of the photometer not exclusively by the relation of the height of the tubular elements 35 to 38 inclusive, but they have lenses for bringing the angularity of the photometer to proper correspondence with that of the selected camera lens (not shown). The tubular extensions 35 to 38 have closures 41 in which suitably selected lenses 39 to 42 of proper field angles are mounted. It will be obvious that here also depending upon the selection of any of these corrective means, the angle of incidence for the photometer may be varied.

Additional means for equalizing the sensitiveness of the photometer in accordance with the angular qualities of the camera lens are illustrated in Figs. 11 to 16 inclusive. In order to vary the sensitiveness of the photoelement 5 and to adapt said photoelement closely to the illuminative strength of the camera lens, a fixed ohmic resistance may be connected in series with the photoelectric cell. If the circuit contains a certain fixed resistance the adjustment of the variable resistance 6, necessary to move the pointer 19 to zero position will be different from the adjustment required for the same purpose with another fixed resistance in the circuit, even though the sensitiveness of the cell 5 be the same.

In Fig. 13 a circuit diagram indicates a fixed additional resistance 43 separately from a tubular corrective means 45 for the photosensitive element 5. In Figs. 11, 12 and 14 to 16 the different resistances 44, 45, 46 and 47, whose ohmic values may vary in dependence upon the illuminative strength of the camera lens with which they are to be used are shown as being directly attached to the corrective means. For instance for the tubular extension 48 in Fig. 11, a fixed additional resistance of 5 resistance units may be used, while in Figs. 14, 15 and 16 the various mountings 49, 50 and 51 to be attached to the photometer may themselves be equipped with resistances of 3, 1.5 and 0.5 units respectively. This modification embodies a combination of several corrective means in the form of a self-contained structure selectively attachable to the photometer for the purpose of adapting the same to the speed or field angle of the selected lens.

As shown in Figs. 11 and 13, the resistance element 43 or 44 is placed in the circuit by having its ends positioned in clamping contact with clips 65, 66 which are parts of the circuit of the instrument.

To facilitate, furthermore, the proper selection of corrective means in accordance with the lens selected for a particular exposure, the mounting of the lens may itself be combined with the corrective means for the photometer and with means for placing both lens and corrective means simultaneously in proper position.

Figs. 17 to 19 inclusive illustrate a camera 54 having a lens the mounting of which is indicated at 55. This mounting is provided with short flanges whereby the lens may be correctly positioned and firmly locked on the camera itself by wedge or cam action. This mounting does not form a part of the present invention. The camera is permanently combined with the exposure meter, the window of which is indicated at $3^x$. The corrective means which, for the purpose of illustration, is shown to be similar to that illustrated in Fig. 3, is connected with the lens mounting 55 by a bracket 56 having prongs 57, 58 between which the tubular element 30 is fixedly secured, the opposite end of the bracket being formed as a ring 60 embracing the mounting 55. The attachment or detachment of the corrective element 30 and mounting 55 to the camera by a bayonet lock or cam (not shown) is made feasible by the annular portion 60 of the bracket having a slot 61 through which a holding screw extends.

In this embodiment, the photosensitive element itself is located in the interior of the camera; and the assembly of dials 24, 25 and 27 for adjusting the pointer 19 of the photometer to its neutral position is shown on one end wall of the camera.

When the lens of the camera is directed towards the object to be photographed, this object will reflect the sunlight or artificial light through the corrective element upon the photoelectric element, not shown, and the operator of the camera after having adjusted the dial 25 to the proper Scheiner degree may turn the dial 24 until the pointer 19 of the instrument has been moved to proper position.

In this manner, the selection of corrective means to accompany the use of any lens selected cannot give rise to errors, and the adjustment can be rapidly carried out.

I claim:
1. In an electric exposure meter, a casing having spaced parallel front and rear walls, the front wall having an opening, a photoelectric cell located within the casing behind said opening so as to be energized by light entering said opening, a measuring instrument located in said casing and positioned laterally of said cell, and having a fixed indicating mark and a movable pointer, said back wall having an opening through which said fixed mark and pointer may be observed, a resistance within said casing located in rear of said cell, means for conductively connecting said cell, measuring instrument and resistance, and means attached to and extending through said rear wall for gradually varying said resistance and indicating correct exposure-time-diaphragm-opening combinations when said pointer has been brought to register with said fixed mark, said last named means including a rotatable disc graduated to denote a set of diaphragm openings, and a second rotatable disc graduated to denote exposure-times and operative for effecting said resistance variations, in virtue of all of which after the meter shall have been sighted on an object and the pointer shall have been brought to register with the fixed mark, the indicating means will remain set regardless of whether the meter remains sighted or not.

2. In an electric exposure meter, a casing having spaced parallel front and rear walls, the front wall having an opening, a photoelectric cell located within the casing behind said opening so as to be energized by light entering said opening, a measuring instrument located in said casing and positioned laterally of said cell, and having a fixed indicating mark and a movable pointer, said back wall having an opening through which said fixed mark and pointer may be observed, a resistance within said casing located in rear of said cell, means for conductively connecting said cell, measuring instrument and resistance, means attached to and extending through said rear wall for gradually varying said resistance and indicating correct exposure-time-diaphragm-opening combinations when said pointer has been brought to register with said fixed mark, said last named means including a rotatable disc graduated to denote a set of diaphragm openings, and a second rotatable disc graduated to denote exposure-times and operative for effecting said resistance variations, and means for co-relating said exposure-time and diaphragm-opening combinations to film speed values, in virtue of all of which after the meter shall have been sighted on an object and the pointer shall have been brought to register with the fixed mark, the indicating means will remain set regardless of whether the meter remains sighted or not.

3. In an electric exposure meter, the combination with a casing provided with openings, of a photoelectric cell adapted to be energized by light entering one of said openings, a measuring instrument adapted to be observed through another one of said openings, a variable resistance within said casing and in rear of said photoelectric cell, means for conductively connecting said cell, measuring instrument and resistance to form a closed electric circuit, detachable means for restricting to a predetermined angle of incidence the light energizing said cell, a fixed resistance mounted on said detachable means, and contact elements on said casing and conductively connected with said electric circuit, and adapted to engage said fixed resistance when said detachable means is mounted in front of said cell.

4. In an electric exposure meter, the combination with a casing having spaced parallel front and rear walls each provided with openings, of a photoelectric cell adapted to be energized by light entering an opening in one of said walls, a measuring instrument adapted to be observed through an opening in the other one of said walls, a resistance within said casing and in rear of said photoelectric cell, means for conductively connecting said cell, measuring instrument and resistance to form a closed electric circuit, rotatable means attached to and extending through the wall through which said measuring instrument is observed for varying said resistance, detachable means for restricting to a predetermined angle of incidence the light energizing said cell, a fixed resistance mounted on said detachable means, and contact elements on said casing and conductively connected with said electric circuit, and adapted to engage said fixed resistance when said detachable means is mounted in front of said cell.

5. In an electric exposure meter, the combination with a casing having spaced parallel front and rear walls each provided with openings, of a photoelectric cell adapted to be energized by light entering an opening in one of said walls, a measuring instrument adapted to be observed through an opening in the other one of said walls, a resistance within said casing and in rear of said photoelectric cell, means for conductively connecting said cell, measuring instrument and resistance to form a closed electric circuit, rotatable means attached to and extending through the wall through which said measuring instrument is observed for varying said resistance, said rotatable means indicating the correct exposure time for a number of diaphragm openings of a camera upon adjustment of said measuring instrument to a predetermined value, detachable means for restricting to a predetermined angle of incidence the light energizing said cell, a fixed resistance mounted on said detachable means, and contact elements on said casing and conductively connected with said electric circuit, and adapted to engage said fixed resistance when said angle varying means is mounted in front of said cell.

6. In an electric exposure meter, the combination with a casing having spaced parallel front and rear walls each provided with openings, of a photoelectric cell adapted to be energized by light entering an opening in one of said walls, a measuring instrument adapted to be observed through an opening in the other one of said walls, a resistance within said casing and in rear of said photoelectric cell, means for conductively connecting said cell, measuring instrument and resistance to form a closed electric circuit, rotatable means attached to and extending through the wall through which said measuring instrument is observed for varying said resistance, said rotatable means being provided with indications denoting exposure times, said casing being also provided with means having gradations denoting diaphragm openings, said exposure time indications upon varying said resistance being moved relatively to said gradations denoting diaphragm openings, the correct exposure time being indicated for each diaphragm gradation upon adjustment of said measuring instrument to a predetermined value, detachable means for restricting to a predetermined angle of incidence the light energizing said cell and adapted to be attached to the casing in front of said cell, a fixed resistance mounted on said detachable means, and contact elements on said casing and conductively connected with said electric circuit and adapted to engage said fixed resistance when said detachable means is mounted in front of said cell.

7. A photoelectric exposure meter including within a casing, a photoelectric cell, a variable resistance in rear of said cell, a measuring instrument including a case, a magnet and an armature provided with a movable pointer located in said case, said pointer being adapted to be observed through axially alined openings in the case and casing, means for conductively connecting said cell, measuring instrument and resistance, a diaphragm-openings scale, means operatively connected with the resistance and cooperating with said diaphragm-openings scale to indicate the correct exposure times for a number of different diaphragm openings upon adjustment of said measuring instrument to a predetermined indication by varying said resistance in conformity with the current generated by the photoelectric cell.

8. A photoelectric exposure meter including within a casing having spaced parallel front and rear walls, a photoelectric cell disc, an annular variable resistance arranged coaxially with said cell, a measuring instrument comprising a magnet, armature and a fixed indication point enclosed in an annular shell, said armature being provided with a movable pointer, the front and rear wall of said casing and of said shell being provided with axially alined openings through which said pointer is adapted to be observed, means for conductively connecting said cell, measuring instrument and resistance, rotatable means attached to the rear wall of the casing coaxially with said photoelectric cell and resistance and operatively connected with the latter to vary the same, said rotatable means carrying indications denoting exposure times and being mechanically associated with other means having gradations denoting diaphragm openings, said exposure time indicating means while being turned to vary said resistance being moved relatively to said gradations denoting diaphragm openings, by virtue of all of which upon adjustment of said measuring instrument to a predetermined value the exposure times for a number of different diaphragm openings is indicated.

9. In an electric exposure meter, the combination with a casing provided with openings, of a photoelectric cell adapted to be energized by light entering one of said openings, a measuring instrument adapted to be observed through another one of said openings, a variable resistance within said casing, means for conductively connecting said cell, measuring instrument and resistance to form a closed electric circuit, and detachable means for restricting to a selectively predetermined angle of incidence the light energizing said cell, said detachable means including a tubular member of selectively predetermined length adapted to be removably attached to said casing in alinement with the opening through which said cell is energized.

10. In an electric exposure meter, the combination with a casing provided with openings, of a photoelectric cell adapted to be energized by light entering one of said openings, a measuring instrument adapted to be observed through another one of said openings, a variable resistance within said casing, means for conductively connecting said cell, measuring instrument and resistance to form a closed electric circuit, and selectively applicable tubular members of different length adapted to restrict the light energizing said cell to a predetermined angle of incidence different from that of the other members, any one of said tubular members being adapted to be interchangeably mounted on said casing in alinement with the opening through which said cell is energized.

HEINZ KUPPENBENDER.